United States Patent
Dhara et al.

(10) Patent No.: US 7,203,185 B1
(45) Date of Patent: *Apr. 10, 2007

(54) METHOD AND APPARATUS FOR PROVIDING BIFURCATED TRANSPORT OF SIGNALING AND INFORMATIONAL VOICE TRAFFIC

(75) Inventors: Krishna Kishore Dhara, Aberdeen, NJ (US); Madhav Moganti, Perth Amboy, NJ (US); Anish Sankalia, Iselin, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 895 days.

This patent is subject to a terminal disclaimer.

(21) Appl. No.: 09/677,060

(22) Filed: Sep. 29, 2000

(51) Int. Cl.
*H04L 12/66* (2006.01)
*H04L 1/00* (2006.01)
*H04M 3/00* (2006.01)

(52) U.S. Cl. .................. 370/352; 370/218; 370/355; 370/389; 379/221.01

(58) Field of Classification Search ............... 370/352, 370/355, 389, 912, 328–351, 401, 217–228; 379/900, 219–221
See application file for complete search history.

(56) References Cited

U.S. PATENT DOCUMENTS

| | | | |
|---|---|---|---|
| 4,726,071 A * | 2/1988 | Jachowski | 455/125 |
| 5,802,465 A * | 9/1998 | Hamalainen et al. | 455/403 |
| 5,845,211 A * | 12/1998 | Roach, Jr. | 455/436 |
| 5,943,408 A * | 8/1999 | Chen et al. | 379/216.01 |
| 6,081,536 A * | 6/2000 | Gorsuch et al. | 370/468 |
| 6,252,952 B1 * | 6/2001 | Kung et al. | 379/114.1 |
| 6,272,325 B1 | 8/2001 | Wiedeman et al. | |
| 6,363,253 B1 * | 3/2002 | Valentine et al. | 455/445 |
| 6,389,130 B1 * | 5/2002 | Shenoda et al. | 379/221.08 |
| 6,477,150 B1 * | 11/2002 | Maggenti et al. | 370/312 |
| 6,584,190 B1 * | 6/2003 | Bressler | 379/230 |
| 6,879,582 B1 * | 4/2005 | Dhara et al. | 370/352 |

OTHER PUBLICATIONS

Chow et al.; "Broadband Network with Enterprise Wireless Communication Method for Residential and Business Environment"; Dec. 19, 2002; United States Patent Application Publication.*

* cited by examiner

*Primary Examiner*—Chi Pham
*Assistant Examiner*—Tri H. Phan

(57) ABSTRACT

A method and apparatus for providing bifurcated voice and signaling traffic over a cable telephony architecture by segregating signaling traffic and voice traffic and transmitting the respective traffic over two different mediums to a controller to establish a phone call.

37 Claims, 13 Drawing Sheets

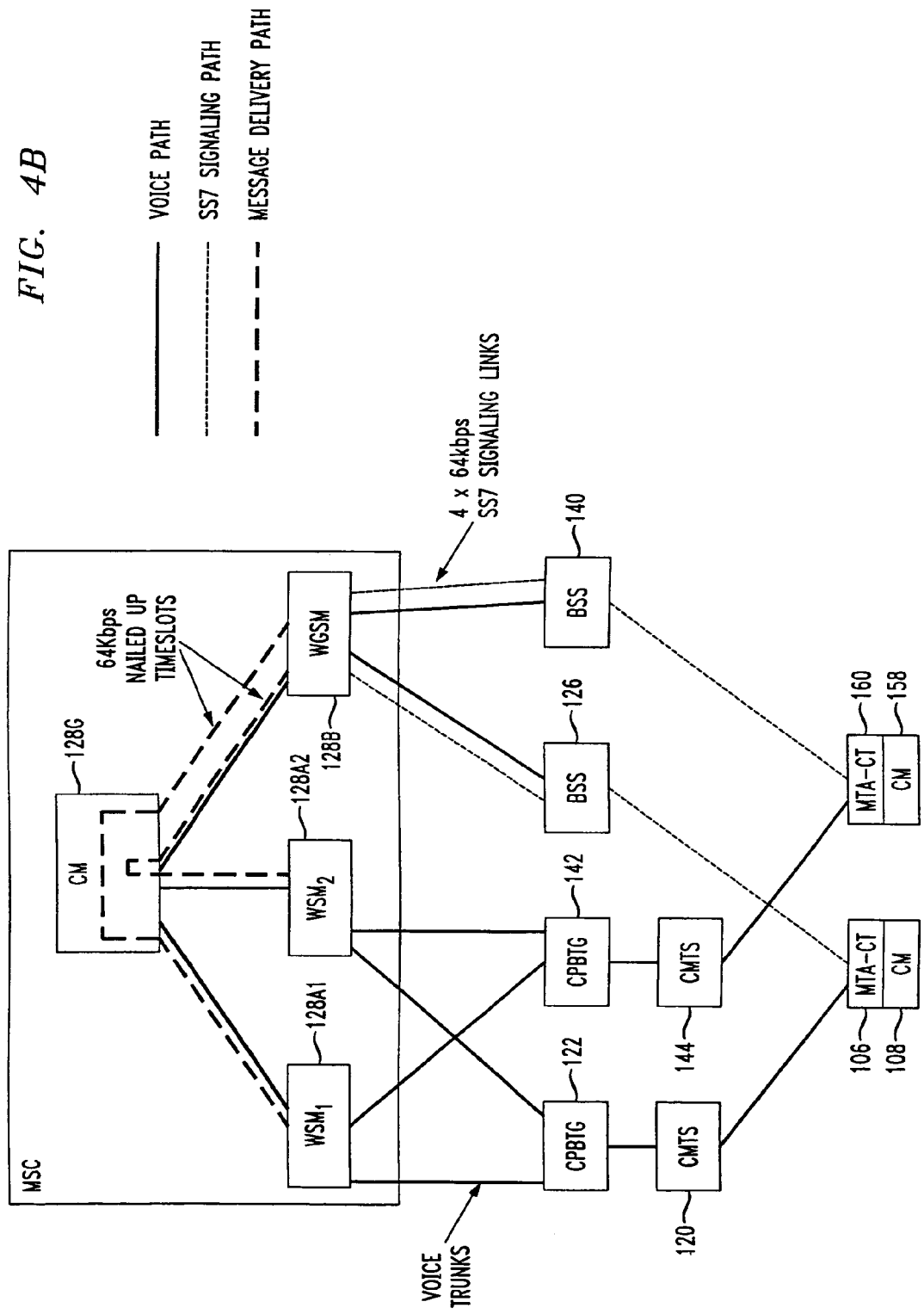

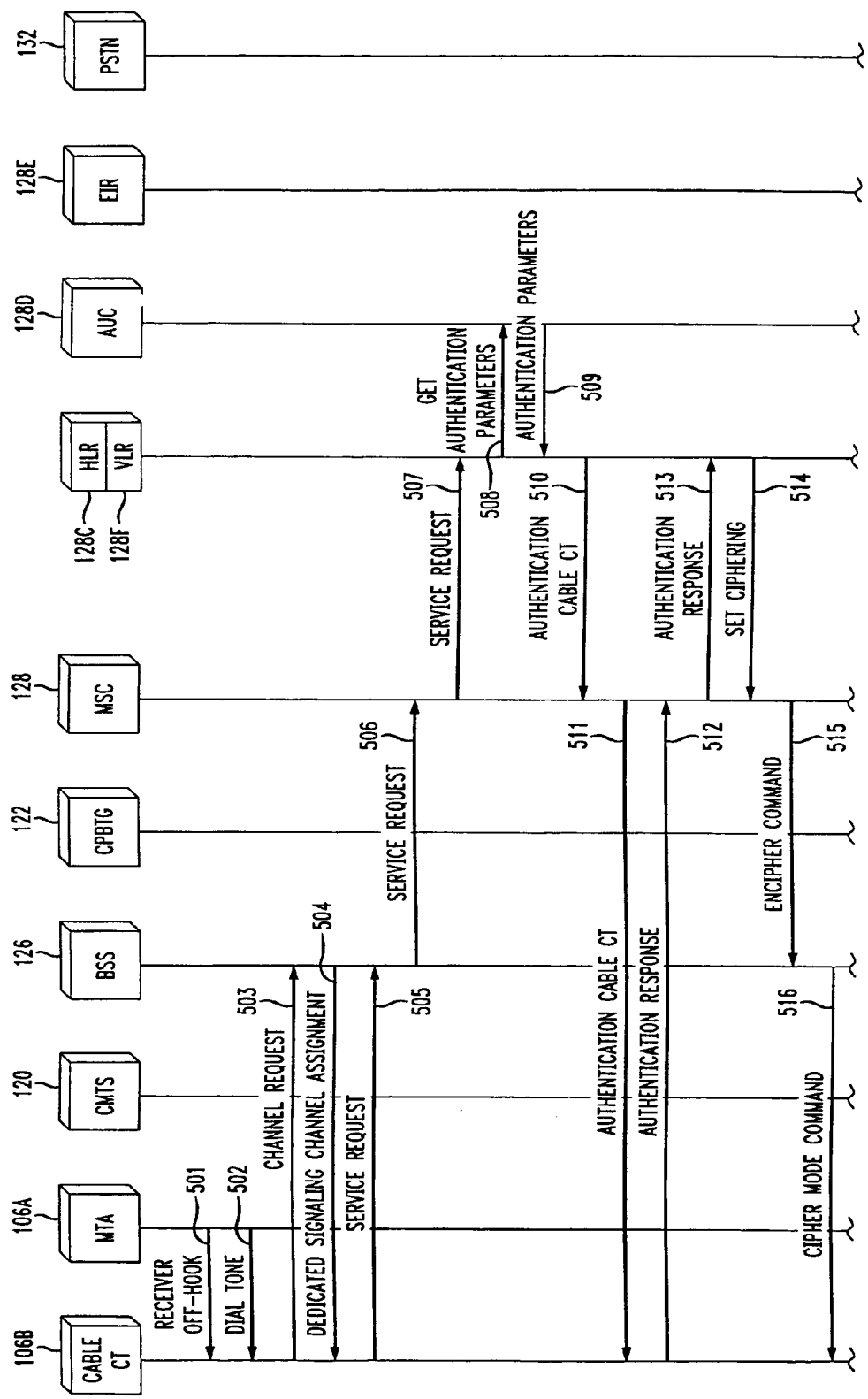

FIG. 6
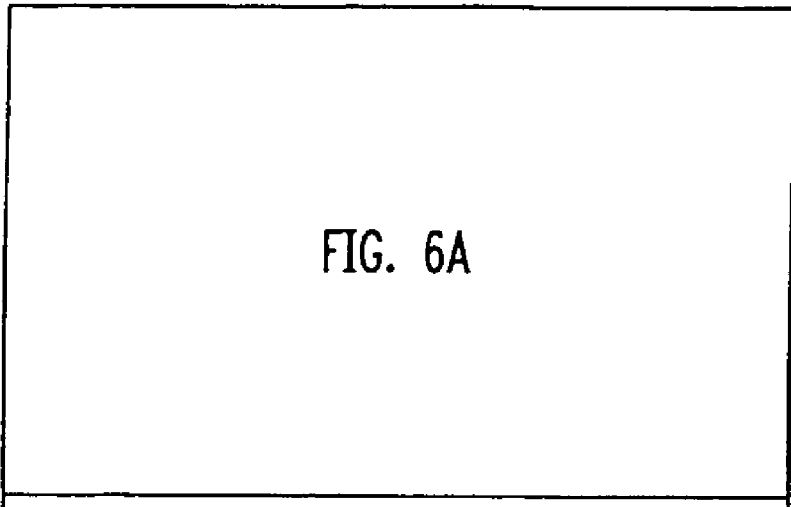
FIG. 6A
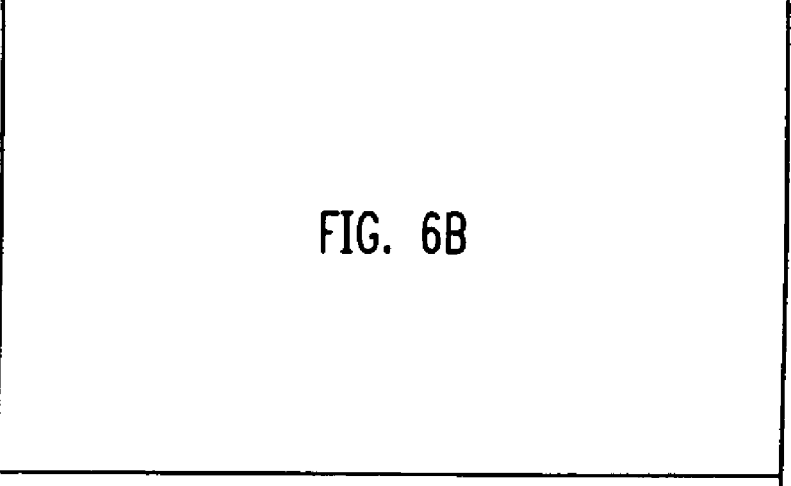
FIG. 6B
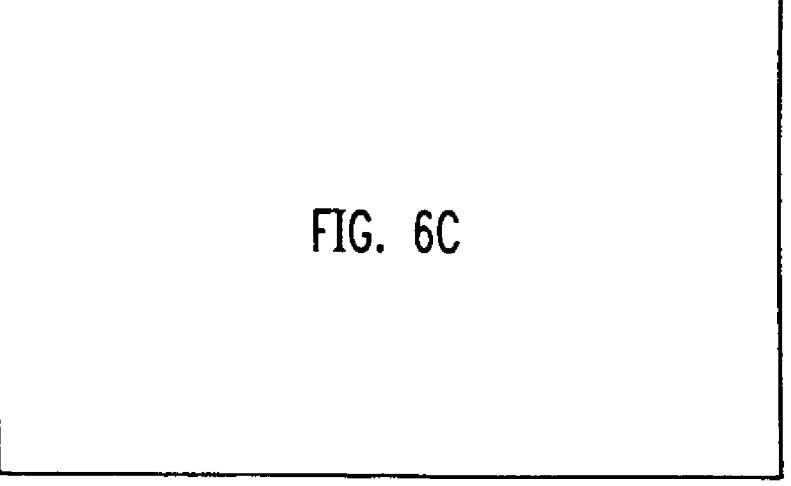
FIG. 6C

METHOD AND APPARATUS FOR PROVIDING BIFURCATED TRANSPORT OF SIGNALING AND INFORMATIONAL VOICE TRAFFIC

TECHNICAL FIELD

The invention relates to the field of communications systems and, more particularly, to a method and apparatus for providing bifurcated signaling and bearer traffic over a cable telephony network.

DESCRIPTION OF THE BACKGROUND ART

A cable telephony network allows voice to be transported over the Public Switch Telephone Network (PSTN) or using a Packetized Voice mechanism such as Voice over Internet Protocol (VoIP) for voice to be transported over an Internet Protocol (IP) network.

Cable companies have an installed base of equipment, which is primarily directed to the transport of video not voice and data. To provide voice over their infrastructure, cable companies must adapt their networks to accept voice at a great economical expense. Compounding the problem is that the transport of voice is very bandwidth intensive due to, for example, transport overhead. For example, to transport a 64 kilobit per second voice call, in certain circumstances, may require more than 140 kilobits per second of IP traffic. Also, the Cable companies require a Quality of Service (QoS) enabled network and a high processing capacity gateway to support VoIP telephony.

Current Host Digital Terminal (HDT) based voice over cable telephony architectures do not have the required end to end bandwidth to support traditional voice processing without the potential of producing signal degradation. Also, existing Packet Cable based voice over cable telephony architectures do not have the required end to end bandwidth to support traditional voice processing without the potential of producing high network delays. Additionally, the transport of voice traffic and signaling information lead to bottlenecks within the infrastructure of the cable telephony network.

SUMMARY OF THE INVENTION

The invention comprises a system and method for providing bifurcated voice and signaling traffic utilizing a suggested hybrid fiber coaxial (HFC)/wireless access architecture. The invention advantageously provides efficient, end-to-end communication by reducing bottlenecks within the infrastructure of the existing cable network. Additionally, signal degradation and delays are reduced.

Specifically, a method, comprising the steps of: segregating signaling traffic and related voice traffic, the signaling traffic including information useful in establishing a communications link for transporting the voice traffic between a calling party and a called party; transmitting the signaling traffic via the first network to a controller, the controller utilizing the signaling traffic to establish the communications link for the voice traffic; and transmitting the voice traffic via the communications link established by the controller, the voice traffic and the signaling traffic being carried by different communications channels.

BRIEF DESCRIPTION OF THE DRAWINGS

FIG. 4B depicts an actual signaling path in a switch according to the invention;

To facilitate understanding, identical reference numerals have been used, where possible, to designate identical elements that are common to the figures.

DETAILED DESCRIPTION OF THE INVENTION

The invention will be described within the context of three subscribers (A, B and C) communicating via respective telephony technologies. It should be noted that the present invention is compatible with different telephony technologies (i.e. Voice over Internet Protocol VoIP, Voice over Digital Subscriber Loop (VoDSL), Fiber to the Home (FTTH) and the like). The benefits of the invention can be gained even if a respective subscriber uses an alternate technology.

It should be appreciated by those skilled in the art that the voice application presented here can be replaced with any multi-media application.

Figure 1:
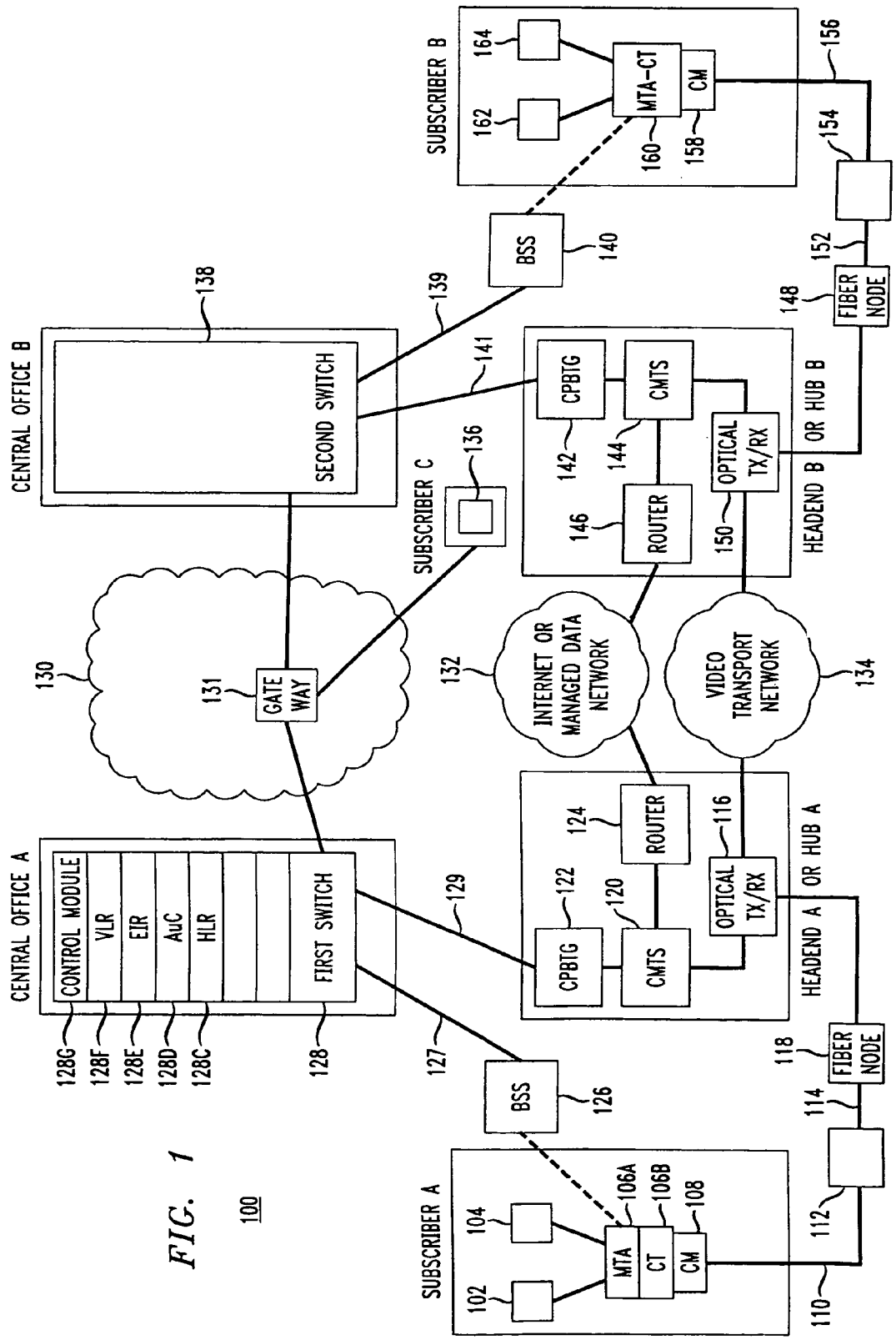
FIG. 1 depicts a high level block diagram of a communications system including the present invention.

FIG. 1 depicts a high level block diagram of a communications system including the present invention. Specifically, the system 100 of FIG. 1 comprises at subscriber A a first computer terminal 102 and a first telephone device 104, both coupled to a first multi-media terminal adapter and cellular transceiver (MTA-CT) 106. First MTA-CT comprises a MTA 106A, a cellular transceiver 106B and a MTA-CT controller 106C. Coupled to first MTA-CT 106 is a first cable modem 108. A first fiber coaxial coupler 112 is connected to the first cable modem 108 via a transmission medium 110.

It should be appreciated by those skilled in the art that first MTA-CT 106 may be integrated into first cable modem 108.

At a cable Headend A or a Hub A, a first optical transceiver 116 is coupled to first fiber node 118. The first fiber node 118 is connected to first fiber coaxial coupler 112 via transmission medium 114. Second transmission medium 114 comprises, for example, a fiber optic cable. First optical transceiver 116 is coupled to a video transport network 134. The video transport network 134 supports the distribution of video and audio signals such as movies to headend offices and to subscribers.

First optical transceiver 116 is also coupled to a first Cable Modem Termination System (CMTS) 120. First CMTS 120, is coupled to a first router 124 which is, in turn, coupled to an internet protocol (IP) network 132. IP network 132 provides interchange of transport data to a second cable headend or Hub. It will be appreciated by those skilled in the art that IP network 132 can be replaced with a data network adhering to a non-IP protocol.

First CMTS 120 is also coupled to a first Circuit Packet Bearer Traffic Gateway (CPBTG) 122. First CPBTG 122' is coupled to a first switch 128, illustratively a class 5 Wireless switch which is also known as a Mobile Switching Center (MSC), via a T1 trunk 129. T1 trunk 129 comprises, illustratively, twenty four Digital Signal Level Zero (DS0) channels.

It should be appreciated by those skilled in the art that first switch 128 may be a voice switch with a wireless interface and that CPBTG 122 may be integrated into the switch.

First switch 128 is coupled to a first base station system 126 via a second T1 trunk. First switch 128 includes a control module or controller 128G, a wireless global switch module 128B which allows a wireless switch module 128A to communicate with first BSS 126, a Visitor Location Register (VLR) 128F for storing the Equipment Identifier Numbers (EIN) 128E of cellular units from outside the serving area making calls within a local calling area; a Home Location Register (HLR) 128C database which, stores the EINs of cellular phones from the local serving area; Equipment Identifier Register (EIR) 128E database for storing EINs of phones allowed to make calls; and Authentication Center (AuC) 128D database performs mathematical computations to verify authenticity of cell phone identity.

It will be appreciated by those skilled in the art that VLR 128F, HLR 128C, EIR 128E, and AuC 128D databases may be stored externally from first switch 128.

First base station system 126 is coupled to first MTA-CT 106 via a radio frequency (RF) link. First switch 128 is also coupled to the Public Switch Telephone Network (PSTN) 130. PSTIN 130 supports communication between first switch 128 and a second switch 138 at central office B (which is local to subscriber B). Included in PSTN 130 is a gateway switch 131 for routing calls between local serving switches, for example, first switch 128 and second switch 138. A third telephone, at subscriber C, is coupled to gateway switch 131.

Second switch 138 is coupled to a second BSS 140 via a third T1 trunk 139. Second BSS 140 is coupled to a second MTA-CT 160, located at subscriber B, via a second radio frequency link. Second MTA-CT 160 is coupled to a second telephone 162 and a second computer 164. Second MTA-CT 160 is also coupled to cable modem 158. A second fiber coaxial coupler 154 is coupled to second cable modem 158 via transmission medium 156 for example, a coaxial cable.

At cable Headend B or Hub B a second optical transceiver 150 receives video from video transport network 134. A second fiber node 148 is coupled to second optical transceiver 150. Second fiber node 148 is coupled to second fiber coaxial coupler 154 via a transmission medium 152 such as coaxial cable. Second optical transceiver 150 is also coupled to a second CMTS 144. CMTS is coupled to a second router 146 which receives and transmits data information to and from the IP network 132. Second CMTS 144 is also coupled to a second CPBTG 142. Second CPBTG 142 is also coupled to second switch 138 via a fourth trunk 141.

In the case of a voice communication from subscriber A to subscriber B, the first MTA-CT 106 detects an "off hook" condition from first telephone 104 and communicates with first BSS 126 via a radio frequency link. First BSS 126 establishes a signaling path, with first switch 128 via a DS0 channel on T1 trunk 127. Signaling between first BSS 126 and first switch 128 can be done using, for example, Signaling System 7 (SS7) protocol.

Once a signaling path is established between first BSS 126 and first switch 128, first BSS 126 notifies first MTA-CT 106 that the signaling path is established. First MTA-CT 106, responsively communicates signaling messages to first switch 128. Once signaling messages are established and the called party picks up the second telephone 162, the voice traffic flows from telephone 104 to first MTA-CT 106 in digitized form to first cable modem 108. The voice signal is then communicated to first CMTS 120. First cable modem 108 and first CMTS 120 utilize Data Over Cable System Interface Specification (DOCSIS) protocol to communicate data packet data between the respective devices. The bandwidth DOCSIS provides primarily depends upon channel radio frequency (RF) bandwidth, symbol rate, and modulation techniques used.

It will be appreciated by those skilled in the art that first MTA-CT 106 will transmit voice in compressed form via first cable modem 108 based upon the wireless technology used. Since first switch 128 is a wireless switch, wireless voice compression techniques can be utilized between first MTA-CT 106 and first switch 128. In case local power is lost to first MTA-CT 106, the voice traffic is transmitted over the wireless network.

Further data compression can be achieved via the use of DOCSIS and Internet Protocol (IP)/User Datagram Protocol (UDP)/Real-time Transport Protocol (RTP) header compression.

First CMTS 120 then communicates voice signals to first CPBTG 122 where the voice signal is depacketized and communicated to first switch 128 in circuit form rather than packet form. Specifically, CPBTG 122 converts voice path setup and packet to circuit conversions and vice versa as opposed to present devices which only perform Network Based Call Signaling (NCS) and voice path-setup. Illustratively, a product such as the Packet Star Access Concentrator model 1250(PSAX 1250) manufactured by Lucent Technologies, Inc of Murray Hill, N.J. could be used with minor modifications as CPBTG 122.

First switch 128 then communicates the voice traffic to PSTN 130 where It is then communicated to second switch 138. Based on a called party number, second switch 138 determines that a call is going to a cable modem customer, and initiates communication with second BSS 140 where a signaling path is established between second switch 138 and second BSS 140. BSS 140, in turn, initiates a signaling path with second MTA-CT 160. Second MTA-CT 160 receives the signaling information and detects a ringing condition from subscriber A. In turn, MTA-CT 160 rings second telephone 162.

Once subscriber B picks up second telephone 162, this signaling information is conveyed back to first MTA-CT 106, and a voice path is established between first MTA-CT 106 and second MTA-CT 160 whereby voice traffic is communicated between first MTA-CT 106 to second MTA-CT 160 via the route first MTA-CT 106 to first cable modem 108 to first CMTS 120 to first CPBTG 122 to first switch 128 over public switch telephone network 130 to second switch 138 to second CPBTG 142 to second CMTS 144 to second cable modem 158 to second MTA-CT 160.

Figure 2:
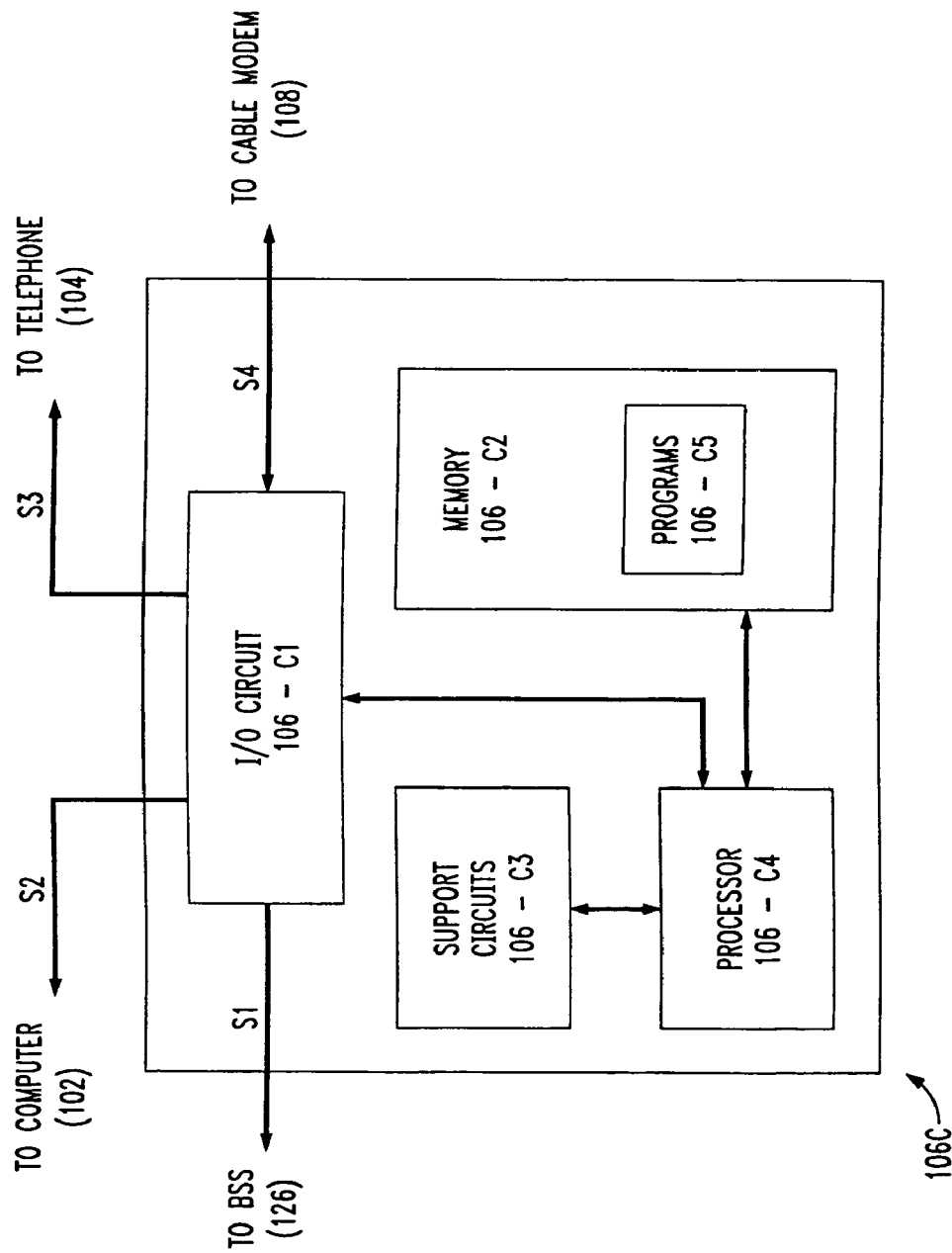
FIG. 2 depicts a high level block diagram of a Media Terminal Adapter-Cellular Transceiver (MTA-CT) controller suitable for use in the communications system of FIG. 1.

FIG. 2 depicts a MTA-CT controller 106C suitable for use in the communications system 100 of FIG. 1. Specifically, the exemplary MTA-CT controller 106C of FIG. 2 comprises a processor 106-C4 as well as memory 106-C2 for storing various control programs such as program 106-C5. The processor 106-C cooperates with conventional support circuitry 106-C3 such as power supplies, clock circuits, cache memory and the like as well as circuits that assist in executing the software routines stored in the memory 106-C2. As such, it is contemplated that some of the process steps discussed herein as software processes may be implemented within hardware, for example, as circuitry that cooperates with the processor 106-C to perform various steps. The MTA-CT controller 106-C also contains input/output circuitry 106-C1 that forms an interface between the various functional elements communicating with the MTA-CT controller 106C. For example, in an embodiment of FIG. 1, the MTA-CT 106 communicates with a first BSS 126 via a signal path S1, a computer 102 via signal path S2, a telephone 104 via signal path S3 and a first cable modem 108 via signal path S4.

Although the MTA-CT controller 106C is depicted as a general purpose computer that is programmed to perform various MTA-CT controller functions in accordance with the present invention, the invention can be implemented in hardware as, for example, an application specific integrated circuit (ASIC). As such, the process steps described herein are intended to be broadly interpreted as being equivalently performed by software, hardware or a combination thereof.

The MTA-CT controller 106C of the present invention communicates with a first cable modem 108 such as those being used by current cable telephony customers to provide voice and data over a network.

Figure 3:
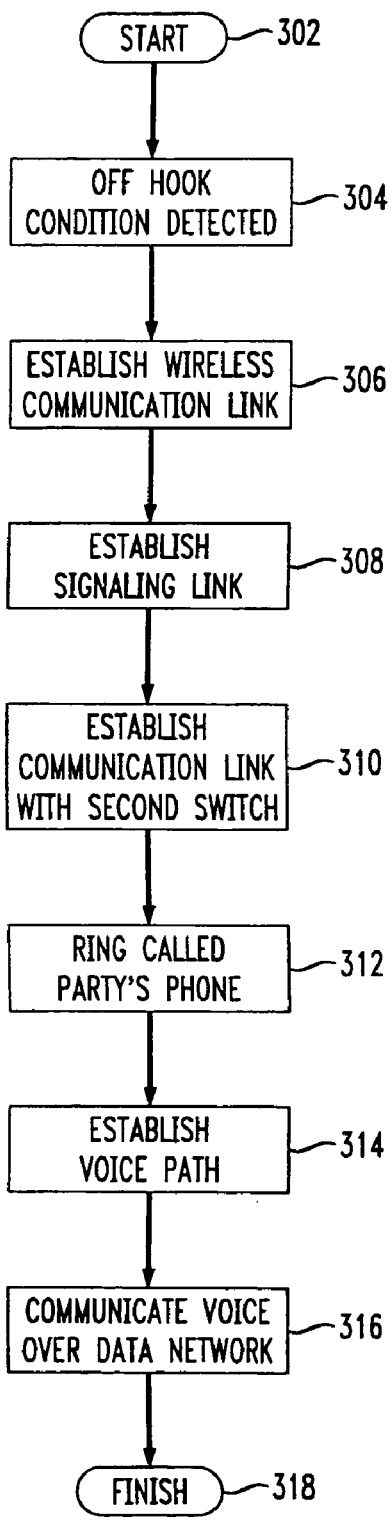
FIG. 3 depicts a flow diagram of a method for providing bifurcated voice traffic and signaling information.

FIG. 3 comprises a flow diagram of a method for providing bifurcated voice traffic and signaling information. Specifically, the method 300 of FIG. 3 utilizes MTA-CT 106 to provide bifurcated voice traffic and signaling information.

The method 300 of FIG. 3 is entered at step 302 and proceeds to step 304, where an "off hook" condition is detected by MTA 106A, and a dial tone is generated by MTA 106A. The method 300 then proceeds to step 306.

At step 306, a wireless communications link is established with first BSS 126. First BSS 126 serves as a link for the CT 106B to communicate and connect a call to a switch.

In response to CT 106B establishing a communication link with first BSS 126, first BSS 126, in turn, establishes a signaling link with first switch 128 at step 308. During the process of establishing a link with first switch 128, the CT 106B is going through an equipment authentication phase. During the equipment authentication phase, the CT's 106B authenticity is determined in a conventional manner.

At step 310, first switch establishes a communications link with second switch 138 via PSTN 130. At step 312, second switch 138, in response, causes subscriber B's second telephone 162 to ring. The method 300 then proceeds to step 314.

At step 314 a voice path is established between subscriber A and Subscriber B. At step 316, in response to a voice path being established at step 314, voice traffic is communicated between subscriber A and subscriber B via first MTA 106, first cable modem 108, first CMTS 120, first CPBTG 122, first switch 128, PSTN 130, second switch 138, second CPTG 142, second CMTS 144, second cable modem 158, and second MTA-CT 160.

At step 318, the method 300 then ends.

Figure 4A:
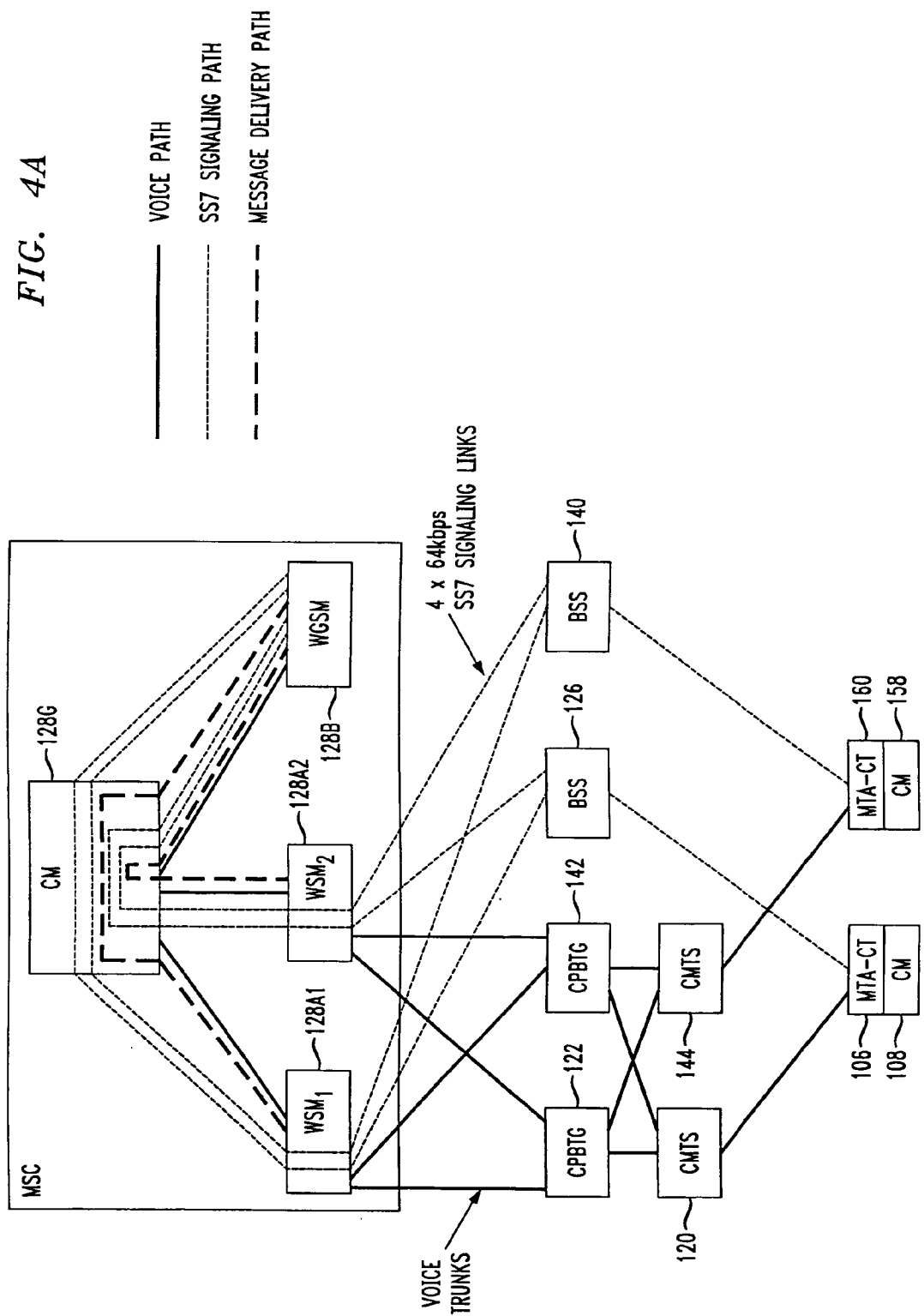
FIG. 4A depicts a logical signaling path in a switch according to the present invention.

FIG. 4A depicts the logical signaling path in the switch according to the present invention. Within the first switch 128 is a control module 128G coupled respectively to WSM$_1$ 128A$_1$, WSM$_2$ 128B$_2$ and WGSM 128B. WGSM 128B is coupled to WSM$_1$ 128A$_1$ and WSM$_2$ 128A$_2$ via DS0 time slots passing through control module 128G. WSM$_1$ 128A$_1$ is coupled, respectively, to first CPBTG 122 and second CPBTG 142 via T1 trunks. WSM$_2$ 128A$_2$ is coupled to first CPBTG 122 and second CPBTG 142 respectively via T1 trunks. First CPBTG 122 is coupled to first CMTS 120 which is in turn coupled to first MTA-CT 106 via a hybrid coax connection. Second CPBTG 142 is coupled to second CMTS 144. Second CMTS 144 is in turn coupled to MTA-CT 160 via a hybrid fiber coaxial connection. WGSM 128B is coupled respectively to BSS 126 and BSS 140 via DS0 channels on a T1 trunk. BSS 126 is coupled to MTA-CT 106 and BSS 140 is coupled to MTA-CT 160 both via radio frequency links. Signaling System 7 (SS7) can be used to provide signaling between first switch 128 and first BSS 126.

When an "off hook" condition is detected for a subscriber, MTA-CT 106 communicates the "off hook" condition to the first BSS 126 via the radio frequency link. BSS 126, in turn, communicates the "off hook" condition to WGSM 128B. WGSM 128B is a wireless switch module with the global responsibility of distributing signaling messages between base station systems and wireless switch modules. All signaling from base station systems ultimately terminate on the wireless global switch module. Up to four maximum signaling links per base signaling station can be engineered. Since T1 trunks and call handling responsibilities between the switch and a given base station system are distributed across multiple wireless switch modules, it is necessary to have a signaling message switch WGSM 128B. The paths between WGSM$_1$ 128A$_1$ and WSM 128A$_2$ and WGSM 128B are known as message delivery paths (MD-PH) and are on dedicated DS0 time slots for the purpose of delivering signaling messages to the correct WSM. Each wireless switch module has one MD-PH to the wireless global switch module. For example, if a switch is equipped with 10 WSMs, then the WGSM would have 10 MD-PHs, one for each of the WSMs. The maximum number of WGSMs that can be equipped in a switch is one. Additionally, the WGSM 128B hides internal switch distributed processor/processing architectural details from base station systems, thus providing the appearance to all base station systems that a switch is logically one entity.

Once a signaling path has been established and the calling party has been alerted that the called party has picked up the telephone, a voice path is established from first MTA-CT 106 to second MTA-CT 160.

WGSM provides a capability for any wireless switch module to send messages to any base station system, and vice versa, even if there are no physical facilities between a given base station system and wireless switch module.

FIG. 4B depicts an actual signal path in a switch according to the invention. The only difference pictorially between FIG. 4A and FIG. 4B is that rather than the signal path going from BSS 126 to WGSM 128B and from BSS 140 to WGSM 128B, the path goes from BSS 126 to WSM$_1$ 128A1 through the control module 128G to WGSM 128B. The signal path also goes from BSS 126 to WSM$_2$ 128A$_2$ to control module 128G to WGSM 128B. The signal path also goes from BSS 140 to WSM$_1$ 128A1 and WSM$_2$ 128A$_2$ through control module 128G to WGSM 128B.

When the base station system initiates communication with a wireless switch module, the wireless switch module communicates with the wireless global switch module via the MD-PH. The wireless global switch module then decides which wireless switch module is to communicate with the base station system. The base station system will not know if the wireless switch module it initiated communication with is not the same wireless switch module processing the signaling messages between the base station system and the wireless system module. The wireless global switch module hides internal switch functions from the base station system, thus providing the appearance to all base station systems that the switch is logically one entity.

Figure 5:
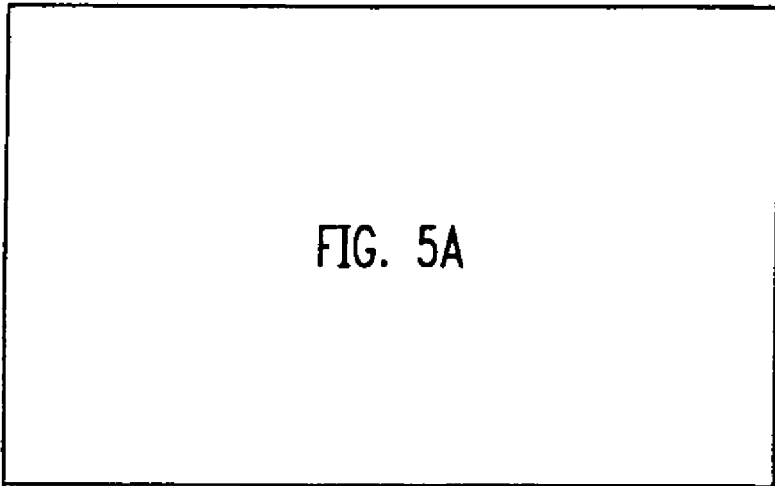
FIG. 5 depicts a call flow diagram of an on network to off network call.
Figure 5:
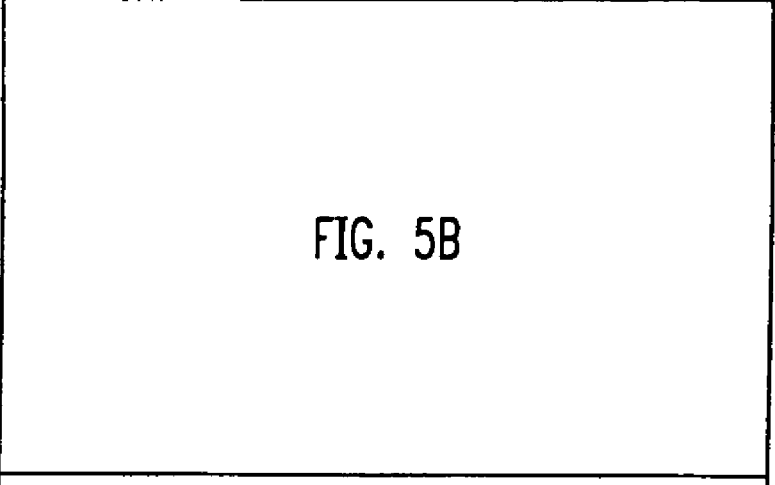
Figure 5:
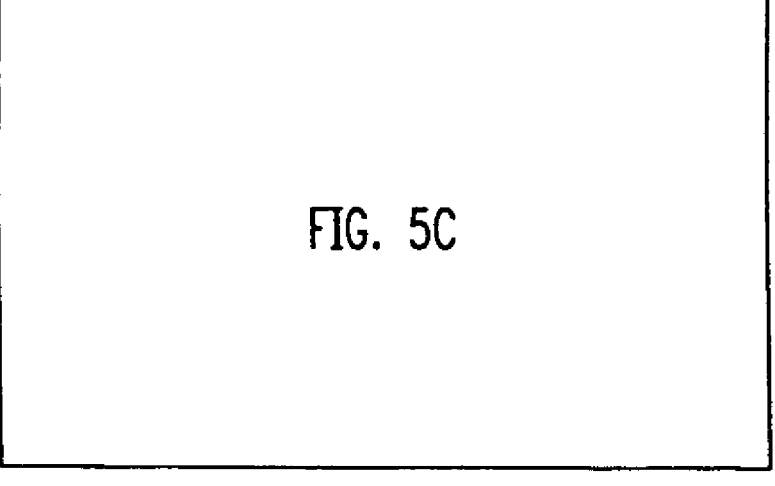
Figure 5B:
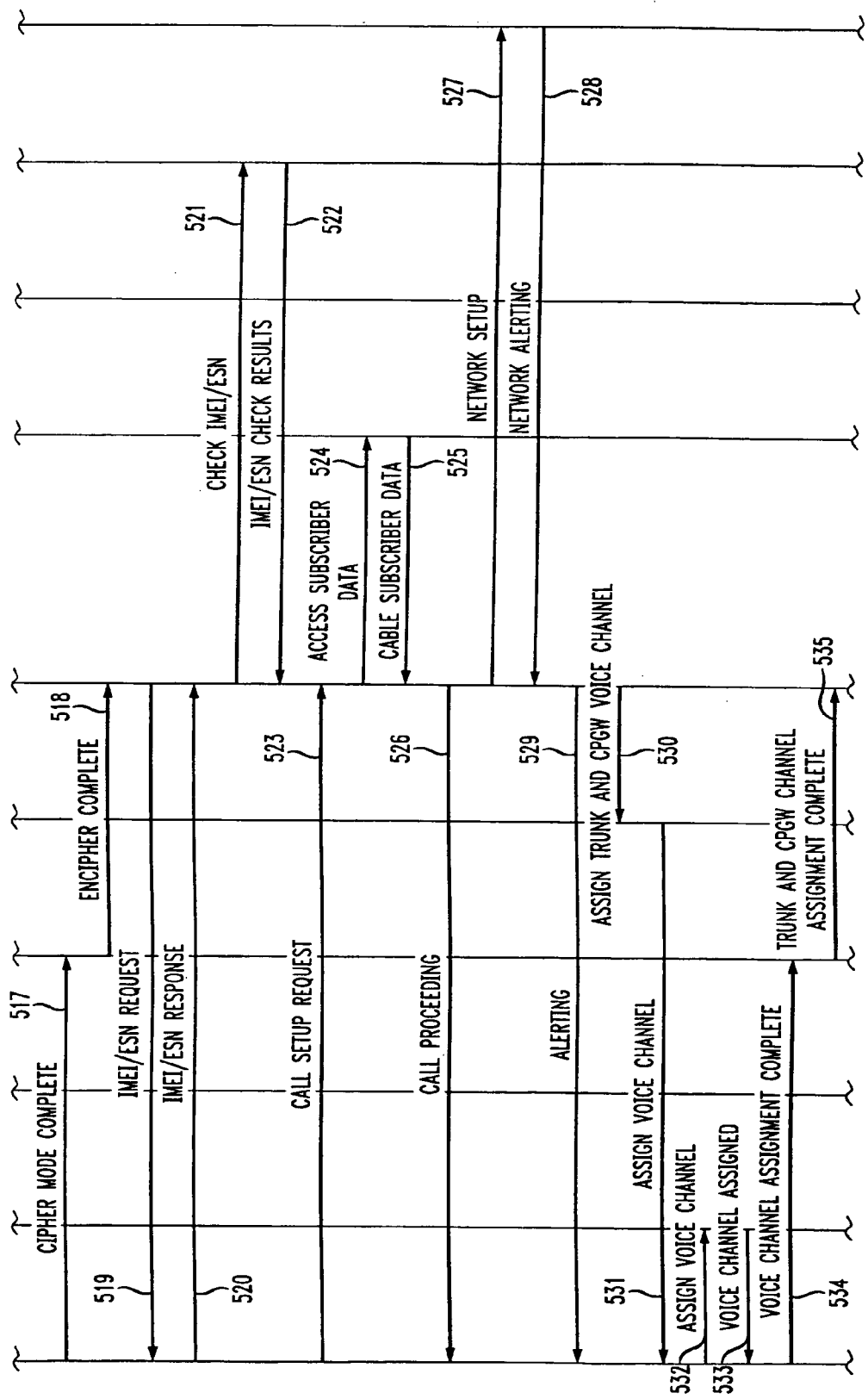
Figure 5C:
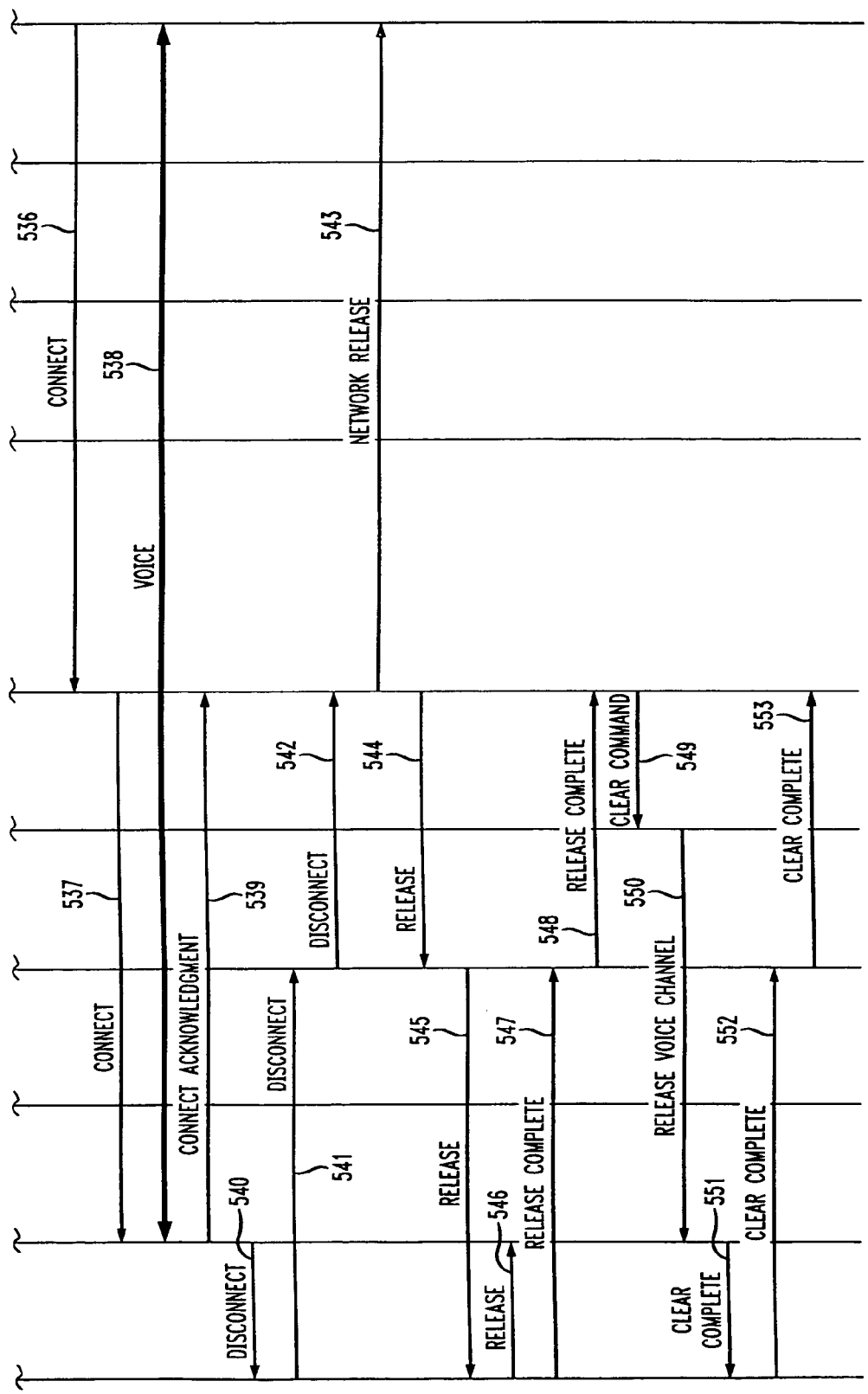

FIG. 5 depicts a call flow diagram useful in understanding an embodiment of the present invention. Specifically, FIG. 5 depicts an on network to off network call flow diagram or process 500.

Party A initiates the call flow at step 501 by picking up first telephone 104. At step 502, the MTA-106A portion of the MTA-CT 106 detects the off hook condition and generates a dial tone. The user then enters the phone number of the called party.

At step 503, the cellular transceiver 106B portion of the MTA-CT 106 communicates a channel request message over a common access channel to first BSS 126. The purpose of the channel request message is to alert the first BSS 126 that a call is being made. The process 500 proceeds to step 504.

At step 504, first BSS 126 dedicates a signaling channel assignment for MTA-CT 106. When first BSS 126 receives the channel request message from MTA-CT 106, it allocates a stand-alone dedicated control channel (SDCCH) and forwards this channel assignment information to the cellular transceiver 106B portion of MTA-CT 106 over the access grant channel (AGCH). It is over the SDCCH that the cellular transceiver 106B portion of first MTA-CT 106 will communicate with first BSS 126 and first switch 128 until a traffic channel is assigned.

At step 505, the CT 106B portion of first MTA-CT 106B communicates a service request message to first BSS 126. The service request message is communicated over the SDCCH. Included in this message is a cellular transceiver temporary cellular identification number (TMSI) and location area identification (LAI). This message also establishes a layer 2 signaling connection between the cellular transceiver 106B of MTA-CT 106 and first BSS 126. Every time a call is made, a TMSI is assigned to CT 106B. The location identifier just identifies the area where the call is made from. The process proceeds to step 506.

At step 506, the first BSS 126 communicates a service request message to first switch 128. This message also causes the start-up of a Signaling Connection Control Part (SCCP) if cellular transceiver 106B does not have any other call instances active. At step 507, first switch 128 informs its Home Location Register (HLR) 128C that a particular cellular transceiver is requesting service.

Process 500 enters the authentication and call setup phase of the call process. At step 508 the HLR 128C requests authentication parameters from an Authentication Center (AUC) 128D. Three authentication parameters are used by the HLR 128C in order to authenticate a given cellular transceiver an authentication Random Number (RAND), an Authentication Side Response (SRES) and a Cipher Key (Kc). The visitor location register VLR 128F is capable of requesting and storing up to five authentication parameters per register as described from the AUC 128D, via the cellular subscriber's HLR 128C. The HLR 128C forwards this request to the Authentication Center 128D.

In response to the HLR's 128C request for authentication parameters the AUC 128D, at step 509, communicates authentication parameters to the HLR 128C. The AUC 128D, using the International Mobile Subscriber Identity (IMSI) which identifies cellular transceiver's 106B home country and service provider, extracts the subscriber's authentication key (Ki). The AUC 128D then generates a random number, applies the Ki and RAND to authentication algorithm (A3) and the cipher key generates an algorithm (A8) to produce an authentication signed response and a cipher key (Kc). The AUC 128D then returns to the HLR 128C authentication parameters: RAND, SRES and Kc.

At step 510, the HLR 128C communicates a request for authentication to first switch 128. This is done for security purposes. The HLR is trying to verify if the call is a legitimate call and that cellular transceiver's 106B identity hasn't been stolen. Included in the message is a random number. At step 511, first switch 128 communicates a request for authentication to cellular transceiver 106B of first MTA-CT 106. First switch 128 forwards the authentication request message to the cellular transceiver 106B. The cellular transceiver 106B portion of first MTA-CT 106 reads this authentication key (Ki) from the Subscriber Identity Module (SIM), applies the random number (RAND) and Ki to both its authentication algorithm (A3) and cipher key generation algorithm (A8) to produce an authentication signed response (SRES) and cipher key (Kc). The cellular transceiver 106B portion of first MTA-CT 106 saves Kc for later and will use Kc when it receives a command to cipher the channel. At step 512, the cellular transceiver 106B portion of first MTA-CT 106 transmits an authentication response to first switch 128. The process 500 then proceeds to step 513.

At step 513, the first switch 128 forwards the SRES message to the HLR 128C. The HLR 128C compares the SRES message returned from the cellular transceiver 106B with the expected SRES message received earlier from the AUC 128D. If the values contained within the SRES messages are equal, the cellular transceiver 106B passes authentication. If unequal, appropriate actions will be taken which could result in the subscriber identity module (SIM) being disabled. For purposes of simplicity, it's assumed that cellular 106B passed authentication.

The process 500 enters the ciphering stage where at step 514, HLR 128C communicates a set ciphering message to first switch 128. The HLR 128C requests the first switch 128 to cipher the radio channel. Included in the message is the cipher key (Kc) which was made available earlier during authentication. At step 515, the first switch 128 communicates an end cipher command to the first BSS 126.

In response to receiving the end cipher command, the first BSS, at step 516, retrieves the cipher key Kc from the message and then transmits a request to the first cellular transceiver 106B requesting it to begin ciphering a channel. At step 517, the first cellular transceiver 106B transmits a cipher mode complete to first BSS 126. The first cellular transceiver 106B uses the cipher key generated previously when it was authenticated to cipher the up link channel, and transmits a confirmation over the cipher channel to first BSS 126.

In response to receiving the cipher mode complete message, first BSS 126, at step 518, uses the cipher key it previously received from the first switch 128 to cipher the downlink channel. First BSS 126 then sends a cipher complete message to first switch 128.

Process 500 now enters the equipment validation phase of the call process. The purpose of the equipment validation phase is to read the cellular equipment serial number from cellular transceiver 106B and check it against the equipment identity register (EIR) to determine if special action should be taken, such as denying service. Equipment validation is optional and is controlled by the service provider.

At this point, the cellular transceiver 106B has been authenticated and the radio channel is being encrypted. Two events will now occur in parallel. First, the first switch 128 interrogates the first cellular transceiver 106B for its equipment number and checks the equipment number against information in equipment identity register. Second, the first cellular transceiver 106B, after receiving the cipher command, forwards a call set up request to the first switch 128. Equipment validation is performed after the ciphering phase and in parallel with call set up. Thus, in this scenario the equipment validation phase is shown to occur before the cellular transceiver 106B forwards a call set up request message to first switch 128.

At step 519, the first switch 128 transmits an international mobile equipment identity (IMEI) or electronic serial number (ESN) request. Cellular transceiver 106B is required to respond with its IMEI or ESN number.

In response to a request for an IMEI or ESN number, cellular transceiver 106B, at step 520, reads this equipment serial number or IMEI number and returns this value to first switch 128. At step 521, the first switch 128 communicates a checked IMEI/ESN message to equipment identity register (EIR) 128E. The EIR 128E checks the validity of the IMEI/ESN. The EIR 128E will first check to see if the IMEI/ESN value is within a valid range. If so, it then checks to see if the IMEI/ESN is on a suspect or known list of invalid equipment.

At step 522, the EIR 128E communicates the IMEI/ESN results to first switch 128. If the results are negative, the first switch 128 might abort the call or possibly let the call continue and will inform the network service provider of the event. For purposes of simplicity, it is assumed that IMEI/ESN is valid.

The process 500 enters the call set up for the on network portion of the call process. At step 523, the cellular transceiver 106B communicates a call set up request message to first switch 128. This can be done after the first cellular transceiver 106B begins ciphering the radio channel. Included in this request message are the dialed digits.

In response to first switch 128 receiving the call set up request message, first switch 128, at step 524, will communicate an access subscriber data message to HLR 128C. The HLR 128C will be requested to supply the subscriber parameters necessary for handling the call. The message will contain a caller number and service indication, if required and available. At step 525, the HLR 128C will communicate the called subscriber data to first switch 128. The HLR 128C will check the call for call barring conditions, such that the first cellular transceiver 106B be barred from making specific outgoing calls or possibly if some supplementary services are active which prevent the call from being granted. If the HLR 128C determines that a call cannot be processed, the HLR 128C will provide the reason to first switch 128. For purposes of simplicity, it is assumed that this procedure is successful. The HLR 128C returns a message to first switch 128 containing the service parameters for the particular subscriber.

At step 526, first switch 128 communicates the call proceeding message to first cellular transceiver 106B. This indicates that a call is being processed. At step 527, first switch 128 communicates a network set up message to PSTN 132. A trunk will be established between first switch 128 and PSTN 132. At step 528, PSTN 132 communicates a network alerting message to first switch 128. This message alerts the first switch 128 that a path has been established between first switch 128 and second switch 138. Included in this message are cellular transceiver's 106B dialed digits and details specifying which trunk should be used for the call. The process 500 proceeds to step 529 where the first switch 128 communicates an alerting message to first CT 106B. This alerting message alerts the CT 106B that a path has been established. Subscriber A will hear ringing from first telephone 104.

At step 530, first switch 128 communicates a message to first CPBTG 122 that a trunk between first switch 128 and CPBTG 122 currently serving the cable subscriber has been allocated. At step 530, included in this message is a trunk number allocated. At step 531, first CPBTG 122 communicates an assigned voice channel message to first cellular transceiver 106B. In turn, first cellular transceiver 106B communicates at step 532 an assigned voice channel to first MTA 106A.

In response to the assigned voice channel message from first cellular transceiver 106B, first MTA 106A, at step 533, communicates a voice channel assigned message to first cellular transceiver 106B. First MTA 106A has created an IP voice path to the CPBTG 122 and communicates a path assignment complete message to first cellular transceiver 106B. At step 534, first cellular transceiver 106B communicates a voice channel assigned and complete message to first BSS 126. At this point, CPBTG 122 connects the voice channel to the assigned trunk to first switch 128. In turn, first BSS 126 at step 535, communicates the trunk and CPBTG 122 channel number assigned and complete message to first switch 128. The CPBTG channel assigned is a voice channel.

The process 500 proceeds to the call set up off network portion of the process. At this point, the voice path has been established between the cellular transceiver 106B and first switch 128. Subscriber A hears silence since a complete voice path has not yet been established. The last phase of setting up a mobile originated call involves first switch 128 establishing a voice path from first switch 128 to the PSTN 132. At step 536, subscriber B has picked up telephone handset 162. This information is communicated to the public switched telephone network 132. The public switched telephone network in turn communicates this information to first switch 128. At step 537, the first switch 128 communicates a connect message to first MTA 106A. The process 500 then proceeds to step 538.

At step 538 a voice path is established between first MTA 106A and public switched telephone network 132. At step 539, first MTA 106A communicates a connect acknowledgement message to first switch 128. Communication between subscriber A and subscriber B can commence.

The process 500 enters the disconnect phase of the call process. In the disconnect phase of the call process, a call can be terminated in one of two ways either via subscriber A hanging up the handset or subscriber B hanging up the handset. For purposes of simplicity, it is assumed that subscriber A hangs up the handset. At step 540, the first MTA 106A detects subscriber A hanging up telephone 104 and communicates a disconnect message to first cellular transceiver 106B. At step 541, the first cellular transceiver 106B communicates the disconnect message to first BSS 126. In turn first BSS 126 communicates, at step 542, a disconnect message to first switch 128.

In response to receiving a disconnect message from first BSS 126, first switch 128, at step 543, communicates a network release message to PSTN 132. The network release message is a command to release the call. The PSTN 132 and first switch 128 will disconnect the call via the trunk connecting first switch 128 and PSTN 132. When the trunk has been released, first switch 128 will communicate a release command at step 543 to first BSS 126. First BSS 126 will in turn communicate the release message to first cellular transceiver 106B. First cellular transceiver 106B will in turn communicate the release message to first MTA 106A at step 546. The process 500 then proceeds to step 547.

At step 547, the first cellular transceiver 106B will communicate a release complete message to first BSS 126. The first BSS 126, at step 548, will communicate a release complete message to first switch 128. At step 549, first switch 128 will communicate a clear command message to CPBTG 122. In response, CPBTG 122, at step 550, will communicate a release voice channel message to first MTA 106A. First MTA 106A will issue a clear complete message at step 551 to first cellular transceiver 106B. At step 552, first cellular transceiver 106B communicates a clear complete message to first BSS 126. Finally, BSS 126, at step 553, communicates a clear complete message to the first switch 128.

Figure 6A:
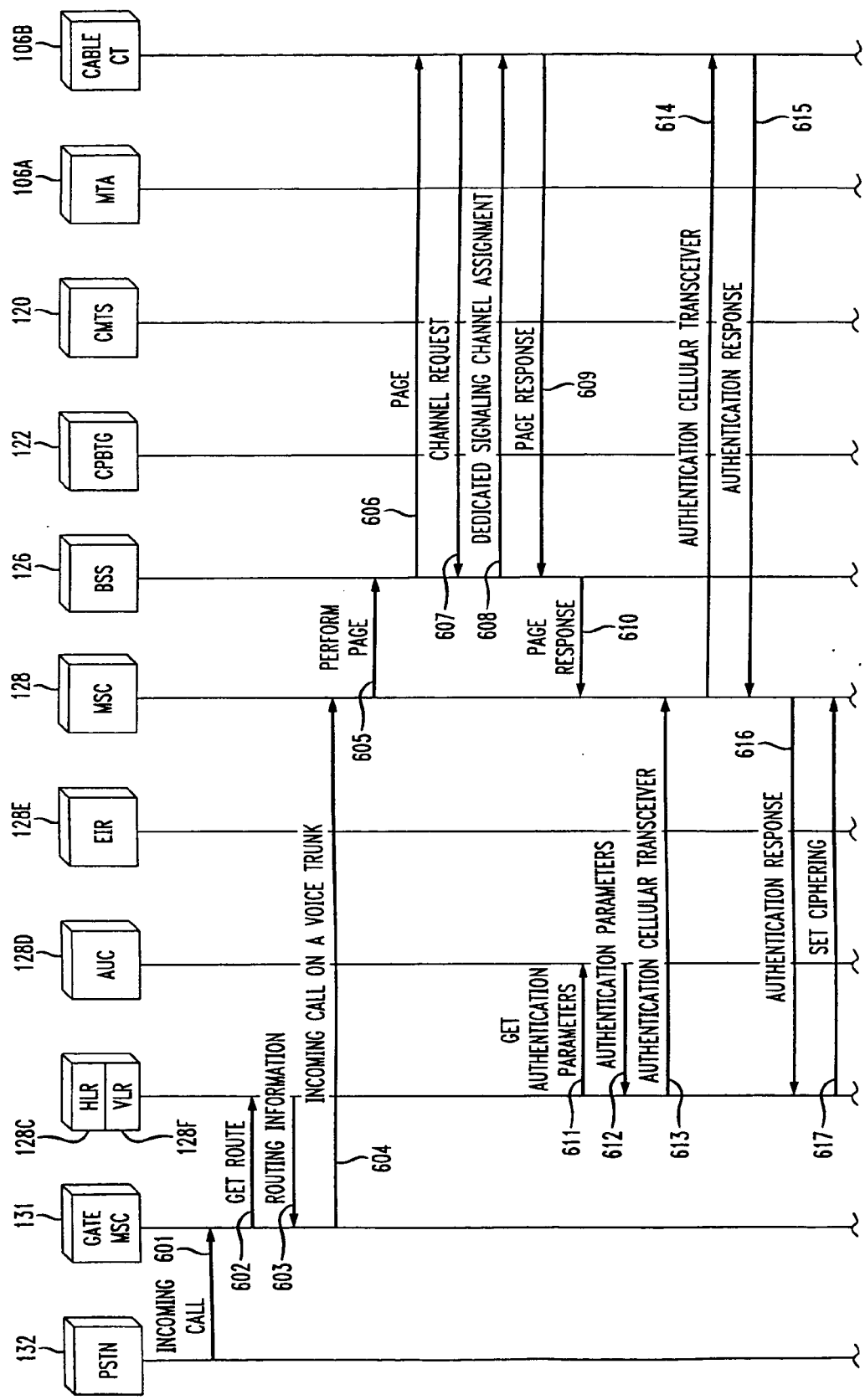
FIG. 6 depicts a call flow diagram of an off network to on network call.
Figure 6B:
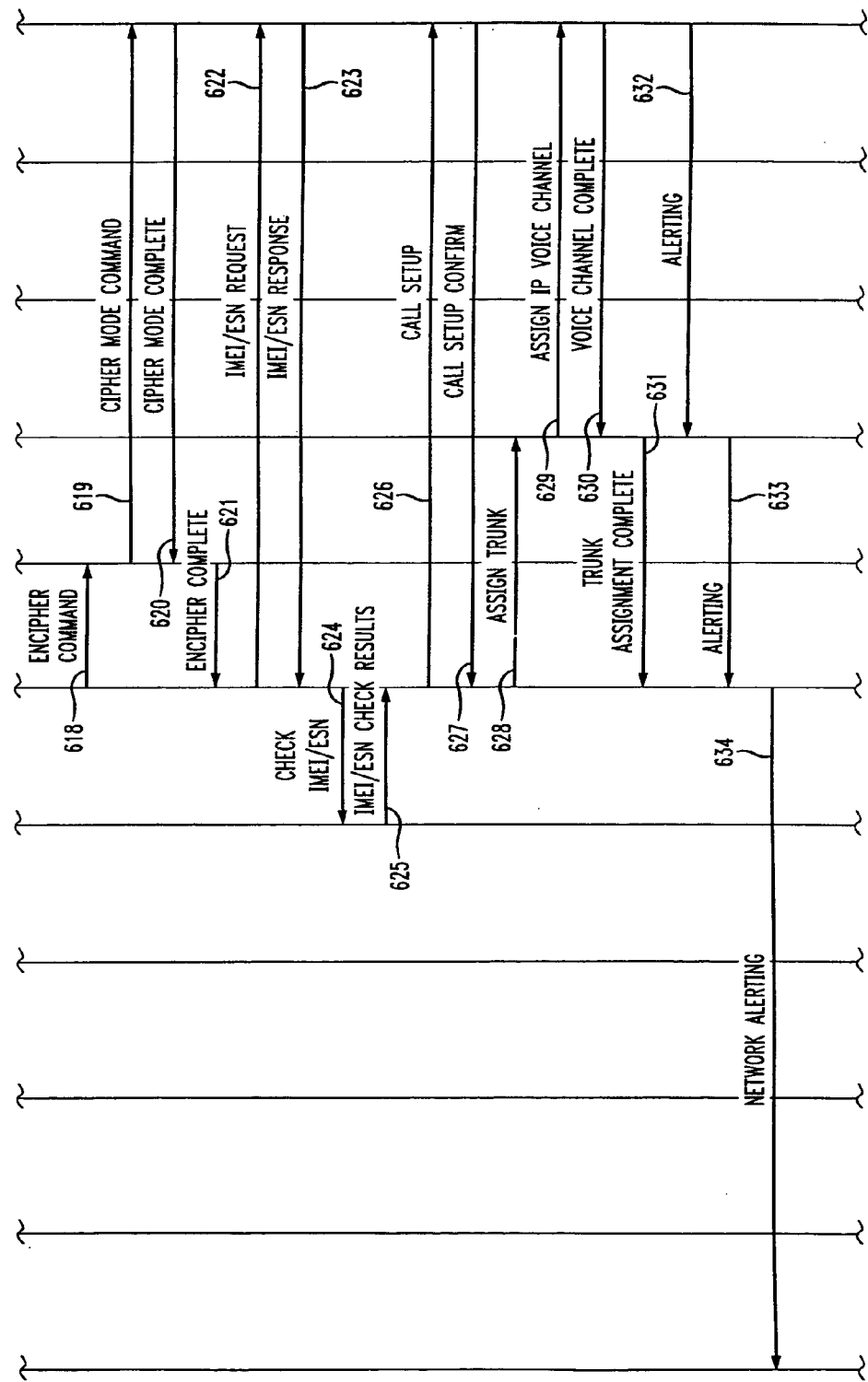
Figure 6C:
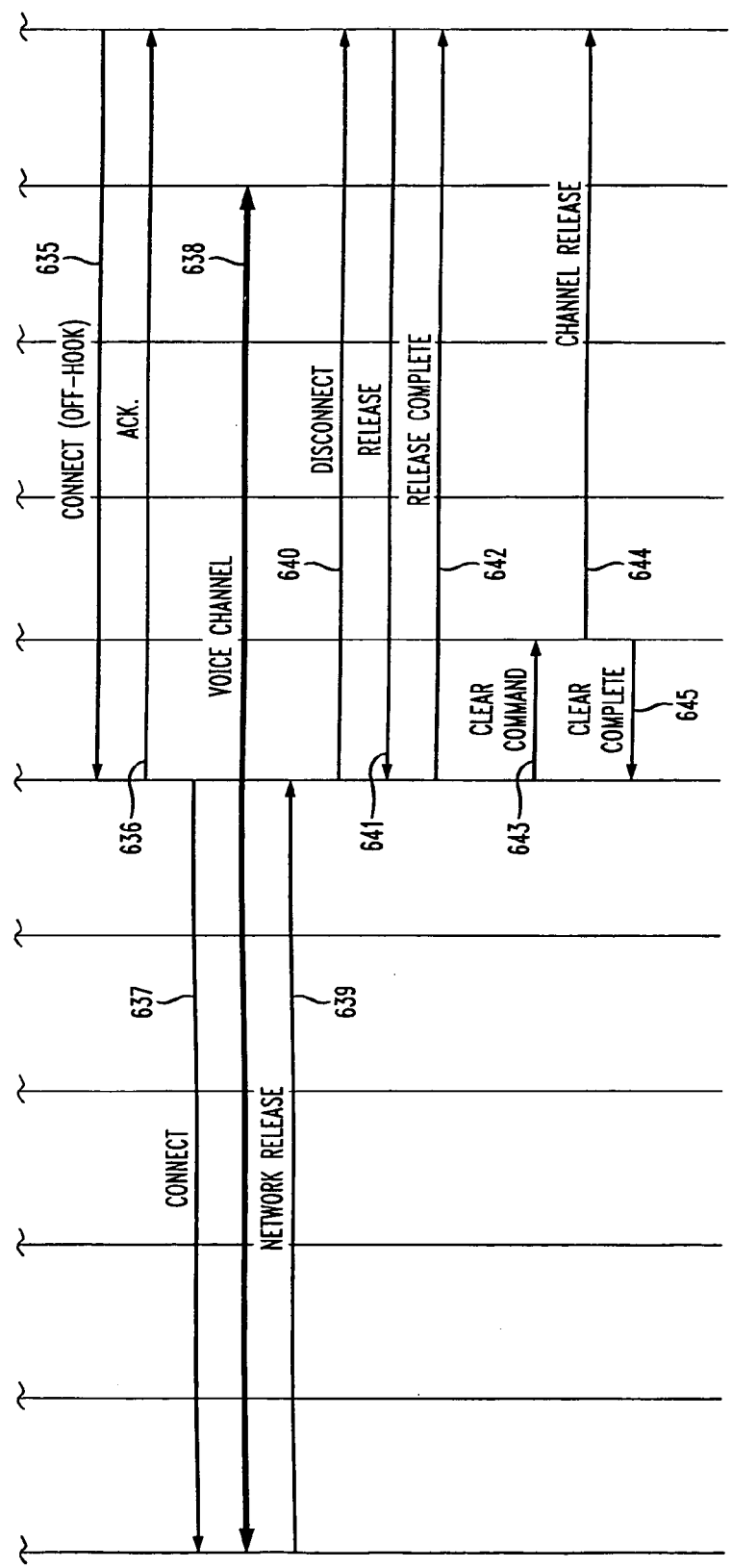

FIG. 6 depicts a call flow diagram useful in understanding an embodiment of the present invention. Specifically, FIG. 6 depicts an off network to on network call routing call flow. Party C initiates a telephone voice call by picking up telephone 136 at step 601 and dialing party A's mobile subscriber integrated services digital network (MSISDN) number. At step 602, PSTN 130 routes the call to gateway switch 131 assigned to its direct number. Gateway switch 131 sends a message to the HLR 128C requesting it to provide routing information for the MSISDN. In response, the message at step 603 HLR 128C returns to gateway switch 131 a directory number of first cellular transceiver 106B. As previously mentioned VLR/HLR can be stored on a switch or external to a switch. For purposes of simplicity it is assumed the HLR/VLR is stored on first switch 128. But those skilled in the art will know that HLR/VLR can be stored anywhere even on gateway switch 131. The method 600 proceeds to step 604.

At step 604, gateway switch 131 communicates an incoming call message to subscriber A's serving switch, for example, first switch 128. At step 605, first switch 128 uses the location area identifier to determine which BSS should page the first cellular transceiver 106B. First switch 128 transmits a message to the BSS, for example first BSS 126, requesting that a page be performed. Included in the message is a TMSI of first cellular transceiver 106B.

In response to the perform page message, first BSS 126, at step 606, broadcasts the TMSI of first cellular transceiver 106B on a paging channel. When first cellular transceiver 106B hears its TMSI, or IMSI, at step 607, broadcasted on the paging channel, first cellular transceiver 106B responds with a channel request message over a common access channel, for example random access channel (RACH). The access scheme for this channel is similar in concept to slotted ALOHA.

In response to the channel request message, first BSS 126, at step 608, allocates a stand alone dedicated control channel (SDCCH) and forwards this channel assignment information to first cellular transceiver 106B over the access grant channel (AGCH). It is over the SDCCH that first cellular transceiver 106B will communicate with first BSS 126 and first switch 128 until a traffic channel is assigned. The method 600 proceeds to step 609.

At step 609, first cellular transceiver 106B transmits a page response message to first BSS 126 over the SDCCH. Included in this message is first cellular transceiver's 106B, TMSI and location area identification (LAI). This message also establishes a layer 2 signaling connection between first cellular transceiver 106B and first BSS 126.

In response to receiving the page response message first BSS 126, at step 610, forwards the page response message to first 128. This message also causes the start up of an SCCP connection, if the first cellular transceiver 106B does not have any other call instances active.

Call process 600 now enters the authentication portion of the call process. Since the air interface is vulnerable to fraudulent access, it is necessary to determine if the TMSI received from the first cellular transceiver 106B is from the SIM that was assigned the TMSI. Authentication is built around the notion that an authentication key (Ki) resides in only two places: in an authentication center (AUC) and in the user's SIM card. Since the authentication key is never to be transmitted, it is virtually impossible for unauthorized individuals to obtain this key to impersonate a given cellular transceiver.

At step 611, the HLR 128C requests authentication parameters from the authentication center (AUC) 128D. At step 612, the AUC 128D, using the IMSI, extracts the subscriber's authentication key (Ki). The AUC 128D then generates a random number, applies the Ki and RAND to both the authentication algorithm (A3) and a cipher key generation algorithm (A8) to produce an authentication signed response and a cipher key (Kc). The AUC 128D then returns to the HLR 128C and authentication triplet: RAND, SRES and Kc.

At step 613, HLR 128C sends a message to first switch 128 requesting that the first cellular transceiver 106B be authenticated. Included in the message is a random number. The process 600 proceeds to step 614.

At step 614, first switch 128 forwards the authentication request message to the first cellular transceiver 106B. First cellular transceiver 106B reads its authentication key (Ki) from the SIM, applies the random number and Ki to both its authentication algorithm (A3) and cipher key generation algorithm (A8) to produce an authentication signed response (SRES) and cipher key (Kc). First cellular transceiver 106B saves Kc for later, and will use Kc when it receives a command to cipher the channel. At step 615, first cellular transceiver 106B returns to generate an SRES to first switch 128.

In response to the message, first switch 128, at step 616, forwards the SRES message to the HLR 128C. The HLR 128C compares the SRES returned from first cellular transceiver 106B with the expected SRES received earlier from the AUC 128D. If equal, first cellular transceiver passes authentication. If unequal, appropriate action will be taken which could result in the SIM being disabled. For purposes of simplicity, it is assumed that cellular transceiver 106B passes authentication.

The process 600 enters the ciphering portion of the call flow where at step 617, the HLR 128C requests that first switch 128 cipher the radio channel. Included in this message is a cipher key (Kc), which was made available during authentication.

In response to the set ciphering message, the first switch 128, at step 618, forwards this request to first BSS 126. At step 619, first BSS 126 retrieves the cipher key, Kc, from the message and then transmits a request to first cellular transceiver 106B requesting it to begin ciphering the channel.

In response to the cipher mode command message first cellular transceiver 106B, at step 620, uses the cipher key generated previously when it was authenticated to cipher the up link channel, and transmits a confirmation over the cipher channel to first BSS 126. At step 621, the first BSS 126 upon receiving the cipher mode complete message uses the cipher key previously received from first switch 128 to cipher the downlink channel. The first BSS 126 then sends a cipher complete message to first switch 128.

The process 600 now enters the equipment validation phase of the call process flow. The purpose of the equipment validation phase is to read the cellular equipment serial number from first cellular transceiver 106B and check it against the equipment identity register (EIR) 128E to determine if special action should be taken, such as deny service. Equipment validation is optional and is controlled by the service provider. Equipment alienation is performed after the cipher phase and can be performed in parallel with call setup or is even performed after the call is set up. For purposes of simplicity, call flow diagram 600 shows the equipment validation phase occurring before call setup. In actuality, the call set up phase will probably be performed immediately after ciphering in order to keep call set up delays at a minimum. Equipment validation would typically occur during call set up.

At step 622, first switch 128 transmits a request to first cellular transceiver 106B requesting it to respond with an international mobile equipment identity or electronic serial number.

In response to a request for an IMEI/ESN, first cellular transceiver 106B, at step 623, communicates an equipment serial number and returns its value to first switch 128. At step 624, first switch 128 then requests the EIR 128E to check the IMEI/ESN for validity. The EIR 128E will first check to see if the IMEI/ESN value is within a valid range. If so, it then checks to see if the IMEI/ESN is on a suspect or known list of invalid equipment. The process 600 then proceeds to step 625.

At step 625, the EIR 128E returns to first switch 128 the results of the IMEI validation. If the results are negative, first switch 128 might abort a call or possibly let the call continue but inform the network service provider of the event. For purposes of simplicity, it is assumed that the IMEI/ESN is valid. Call process 600 now enters the call set up phase of the call process flow. At step 626, first switch 128 communicates a call set up message to first cellular transceiver 106B. After first switch 128 received the encipher complete message from the first cellular transceiver 106B, first cellular transceiver 106B is informed that a call will be set up via a set up message.

Upon receiving the set up message, first cellular transceiver 106B performs a compatibility check before responding to the set up message. It is possible that first cellular transceiver 106B might be incompatible for certain types of call set ups. Assuming that first cellular transceiver 106B passes the compatibility check, it acknowledges the call set up message, at step 627, with a set up confirm message to first switch 128. The call process of 600 then proceeds to step 628.

At step 628, first switch 128 communicates an assign trunk message to CPBTG 122. CPBTG 122 assigns a trunk from the trunks linking CPBTG 122 and first switch 128. At step 629, CPBTG 122 communicates an assign IP voice channel message to cellular transceiver 106B.

In response to the assign voice channel message, cellular transceiver 106B creates an IP voice path to CPBTG 122 and communicates a voice channel complete message to CPBTG 122, at step 630. CPBTG 122, in turn, communicates a trunk assignment complete message to first switch 128 indicating that a trunk has been selected, at step 631. Included in this message is a trunk number. The process 600 then proceeds to step 632.

At step 632, once alerting has begun, first cellular transceiver 106B sends an alerting message to first BSS 126. In response to the alerting message, first BSS 126, at step 633, forwards an alerting message to first switch 128.

Upon receiving the alerting message, first switch 128, at step 633, communicates a network alerting message to PSTN 130. First switch 128 communicates audible ringing to subscriber A. Prior to this, the calling party heard silence.

At step 635, subscriber A picks up telephone 104. In response to this first cellular transceiver 106B stops alerting and sends a connect message to first switch 128.

In response to receiving a connect message from CT 106B, first switch 128 communicates an acknowledgement message to CT 106B.

First switch 128, at step 637, removes audible ringing to PSTN 130 and connects the PSTN trunk to first BSS 126 and sends a connect message to the PSTN 130. At step 638, a voice channel is established between subscriber A and subscriber C.

Call process 600 now enters the release stage. At step 639, subscriber C hangs up the telephone 136. This results in PSTN 130 sending a network release signal to first switch 128. The actual type of message that is received from the remote exchange depends on country signaling conventions. This message could, for example, be a clear-forward message (Q.721–Q.725) or release message (Q.761–Q.764).

At step 640, first switch 128 requests first cellular transceiver 106B to begin its clear procedure. In response to the disconnect message, first cellular transceiver 106B, at step 641, informs first switch 128 that it has started its clear procedure by communicating a release message. The process 600 then proceeds to step 642.

At step 642, the first switch 128 acknowledges receiving first cellular transceiver's 106B release message by communicating a release complete message to cellular transceiver 106B. First cellular transceiver 106B completes its clear procedure.

The previous four steps cause a given instance of a call to be released. If the first cellular transceiver 106B has one or more other instances of a connection active between itself and the first switch 128, then the next three steps are not performed. With respect to signaling, a cellular transceiver can have several instances of calls all sharing the same voice switch dedicated signaling connection. The signaling connection control part (SCCP) layer of the "A interface" between first BSS 126 and first switch 128 is used in a connection oriented fashion. A SCCP connection is established when a cellular transceiver first gains access to the network and is torn down when all call activity instances have concluded.

At step 643, assuming that there are no more instances of calls with first cellular transceiver 106B, first switch 128 sends a clear command to first BSS 126 asking it to release all allocated dedicated resources for a given SCCP connection.

In response to the clear command, first BSS 126, at step 644, instructs first cellular transceiver 106B to release the radio traffic channel by communicating a release message. First cellular transceiver 106B would then go back to its idle mode of operation, which involved searching and returning to the strongest signal from first BSS 126.

Finally, at step 645, first BSS 126 acknowledges that it has released all allocated dedicated resources.

Although various embodiments which incorporate the teachings of the present invention have been shown and described in detail herein, those skilled in the art can readily devise many other varied embodiments that still incorporate these teachings. As such, the appropriate scope of the invention is to be determined according to the claims which follow herewith.

What is claimed is:

1. A method of transporting bifurcated voice and signaling data over a network, comprising the steps of:
   identifying at a subscriber device, for each communication link to be established, respective signaling data and voice data;
   transmitting from the subscriber device said signaling data via a first network and said voice data via a second network, wherein the first network is different from the second network; and
   switching the voice data to the same network as the signaling data when loss of local power is detected at the subscriber device.

2. The method of claim 1, wherein said first network is a wireless network.

3. The method of claim 1, wherein said second network is a data packet network.

4. The method of claim 1, further comprising the steps of: communicating said signaling data to a switch.

5. The method of claim 1, further comprising: communicating said voice data to a switch.

6. The method of claim 3, wherein said voice data is subject to compression processing compatible with a wireless network.

7. The method of claim 4, wherein said step of communicating is made via a base station system.

8. The method of claim 5, wherein said step of communicating is made via a means adapted to perform packet to circuit switched conversion and vice versa.

9. The method of claim 1, wherein said steps of identifying and transmitting are performed via a Media Terminal Adapter-Cellular Transceiver (MTA-CT) having integrated MTA and CT portions.

10. The method of claim 1, wherein said steps of identifying and transmitting are performed via a Media Terminal Adapter-Cellular Transceiver (MTA-CT) having non-integrated MTA and CT portions.

11. In a communication system for transporting bifurcated voice and signaling traffic over a network, a method comprising the steps of:
   segregating at a subscriber device signaling traffic and related voice traffic including information useful in establishing a communications link for transporting said voice traffic between a calling party and a called party;
   transmitting from the subscriber device said voice traffic via said communications link established by a controller, said voice traffic and said signaling traffic being carried via different communication networks; and
   switching the voice traffic to the same communication network as the signaling traffic when loss of local power is detected at the subscriber device.

12. The method of claim 11, wherein one of said communication networks is a data packet network.

13. The method of claim 12, wherein said voice traffic is carried by said data packet network.

14. The method of claim 13, wherein said voice traffic is subject to compression processing compatible with a wireless network.

15. The method of claim 11, wherein one of said communication networks is a wireless network.

16. The method of claim 15 wherein said signaling traffic is carried by said wireless network.

17. The method of claim 11, wherein said controller is a switch.

18. The method of claim 11, wherein said signaling traffic is transmitted to said controller via a base station system.

19. The method of claim 11, wherein said voice traffic is communicated to said controller via a means adapted to perform packet to circuit switched conversion and vice versa.

20. The method of claim 11, wherein said steps of segregating and transmitting are performed via a Media Terminal Adapter-Cellular Transceiver (MTA-CT) having integrated MTA and CT portions.

21. The method of claim 11, wherein said steps of segregating and transmitting are performed via a Media Terminal Adapter-Cellular Transceiver (MTA-CT) having non-integrated MTA and CT portions.

22. In a communication system for transporting bifurcated voice and signaling traffic between a calling party and called party, a method comprising the steps of:
   identifying at a subscriber device a call request;
   establishing a signaling link from the subscriber device to a switch via a first transport network;
   establishing a voice path from the subscriber device to said switch via a second transport network responsive to a determination that said called party answers, said first transport network being different from said second transport network; and
   switching the voice traffic to the same network as the signaling traffic when loss of local power is detected at the subscriber device.

23. The method of claim 22, wherein said first network is a wireless network.

24. The method of claim 23, wherein signaling traffic is transmitted over said wireless network.

25. The method of claim 22, wherein said second network is a data packet network.

26. The method of claim 25, wherein voice traffic is communicated over said data packet network.

27. The method of claim 26, wherein said voice traffic is subject to compression processing compatible with a wireless network.

28. The method of claim 22, wherein said steps of identifying and said first and second steps of establishing are performed via a Media Terminal Adapter-Cellular Transceiver (MTA-CT) having integrated MTA and CT portions.

29. The method of claim 22, wherein said steps of identifying and said first and second steps of establishing are performed via a Media Terminal Adapter-Cellular Transceiver (MTA-CT) having non-integrated MTA and CT portions.

30. A communications system, comprising:
   a subscriber device for providing bifurcated voice and signaling traffic, wherein said subscriber device comprises a Media Terminal Adapter (MTA) portion and a Cellular Transceiver (CT) portion, wherein said subscriber device is adapted to identify, for each communication link to be established, respective signaling traffic and voice traffic, transmit said signaling traffic via a first network and said voice traffic via a second network where the first network is different from the second network, and switch the voice traffic to the same network as the signaling traffic when loss of local power is detected; and
   means for converting data packets to circuit switched traffic and vice versa.

31. The communications system of claim 30, wherein said device is a Media Terminal Adapter-Cellular Transceiver (MTA-CT), wherein the MTA portion and the CT portion are non-integrated.

32. The communications system of claim 30, wherein said device is a Media Terminal Adapter-Cellular Transceiver (MTA-CT), wherein the MTA portion and the CT portion are integrated.

33. A computer readable medium storing a software program, that when executed by a computer, causes the computer to perform a method comprising:
   segregating at a subscriber device signaling traffic and related voice traffic including information useful in establishing a communications link for transporting said voice traffic between a calling party and called party;
   transmitting from the subscriber device said voice traffic via said communications link established by a controller, said voice traffic and said signaling traffic being carried via different communication networks; and
   switching the voice traffic to the same communication network as the signaling traffic when loss of local power is detected at the subscriber device.

34. The computer readable medium of claim 33, wherein said controller is a switch.

35. The computer readable medium of claim 33, wherein said signaling traffic is communicated via a wireless network.

36. The computer readable medium of claim 33, wherein said voice traffic is communicated via a data packet network.

37. The computer readable medium of claim 36, wherein said voice traffic is subject to compression processing compatible with a wireless network.

* * * * *